United States Patent [19]
Flint et al.

[11] Patent Number: 5,355,286
[45] Date of Patent: Oct. 11, 1994

[54] RETRACTABLE HEADLAMP ASSEMBLY

[75] Inventors: Gerald A. Flint, Rochester Hills; Edward Zentner, Clarkston, both of Mich.; Bryan T. Welch, Noblesville, Ind.

[73] Assignee: General Motors Corporation, Detroit, Mich.

[21] Appl. No.: 149,406

[22] Filed: Nov. 9, 1993

[51] Int. Cl.5 .............................................. B60Q 1/05
[52] U.S. Cl. ........................................ 362/65; 362/80
[58] Field of Search .................... 362/61, 65, 66, 80

[56] References Cited
U.S. PATENT DOCUMENTS

| | | | |
|---|---|---|---|
| 4,186,476 | 2/1980 | Mair et al. | 29/407 |
| 4,516,191 | 5/1985 | Moriyama et al. | 362/65 |
| 4,602,319 | 7/1986 | Moriyama et al. | 362/65 |
| 4,785,382 | 11/1988 | Fukura et al. | 362/65 |
| 4,821,155 | 4/1989 | Harting | 362/65 |
| 4,943,895 | 7/1990 | Brandenburg | 362/66 |
| 4,947,295 | 8/1990 | Carrell | 362/64 |

Primary Examiner—Stephen F. Husar
Attorney, Agent, or Firm—Ernest E. Helms

[57] ABSTRACT

A concealed vehicle headlamp is provided including a pivot bracket mounted to the vehicle, a headlamp housing pivotally mounted to the pivot bracket for movement between closed and open positions, a headlamp mounted to the housing for movement between the closed and open positions, the headlamp being adjustable relative to the headlamp housing for aiming, a motor to move the headlamp housing in the open and closed positions, a spider adjustable in fore and aft and cross car directions with respect to the headlamp housing, an intermediate panel having fore and aft ends vertically adjustable with respect to the spider, and a cover panel having means of concealed attachment with the intermediate panel for fitting flush with respect to the vehicle body when the headlamp housing is in the closed position.

6 Claims, 1 Drawing Sheet

RETRACTABLE HEADLAMP ASSEMBLY

FIELD OF THE INVENTION

The field of the present invention is that of a retractable concealed headlamp assembly for automotive-type vehicles.

BACKGROUND OF THE INVENTION

It is known on vehicles with retractable concealed headlamps to have a housing that rotates relative to the vehicle body from a closed position hiding the headlamps to an open position exposing the headlamps. The headlamps are required to adjust relative to the housing so that the headlamps can be properly aimed when the headlamps are in an open position.

It is known that an appearance or cover panel of the housing must be adjustable relative to the vehicle body so that the cover panel is flush with the vehicle body when the housing is in the closed position. To adjust the cover panel, the housing is rotated to the open position. A pivot bracket (which mounts the housing to a vehicle frame member), an actuator motor linkage and the housing are positionally adjusted. It is possible that the parts may have to be temporarily disconnected in order to make the adjustment. The housing is then moved to the closed position to determine if the adjustments were proper and the trial-and-error process continues. This process is made more difficult in that many assemblers having difficulty in determining what has to be adjusted in the open position to achieve the desired result in the closed position. After the housing is properly adjusted, the headlamps must be re-aimed since the previously-mentioned adjustments affect the aim of the headlamps.

The above adjustments can be further complicated when such adjustments are needed after repair to the vehicle since the components which must be positionally adjusted are not as readily accessible to a repair operator versus an initial vehicle assembly operator. Many retractable headlamp designs require assembly and adjustment of the headlamp assembly prior to the installation of the vehicle's front facia due to access limitations.

It would be desirable to have a headlamp assembly where the cover panel can be adjusted with the housing in the closed position and wherein the adjustment of the cover panel position will not affect the headlamp aim. It would also be desirable to permit final adjustment of the cover panel in all the planes after the front facia, fender and hood of the vehicle are in place.

SUMMARY OF THE INVENTION

To meet the above-noted desires and to provide an alternative concealed retractable headlamp assembly than that previously available, the present invention is brought forth wherein the cover panel, in a preferred embodiment, has fore and aft, transverse and vertical adjustment with the headlamp assembly so that the appearance panel may be flush with a headlamp opening provided by a hood, front fascia and fender of an automotive vehicle, thereby providing an appearance that is more pleasing and more aerodynamic due to its flushness with adjacent surfaces.

DETAILED DESCRIPTION OF THE PREFERRED EMBODIMENT

Figures 1, 2:
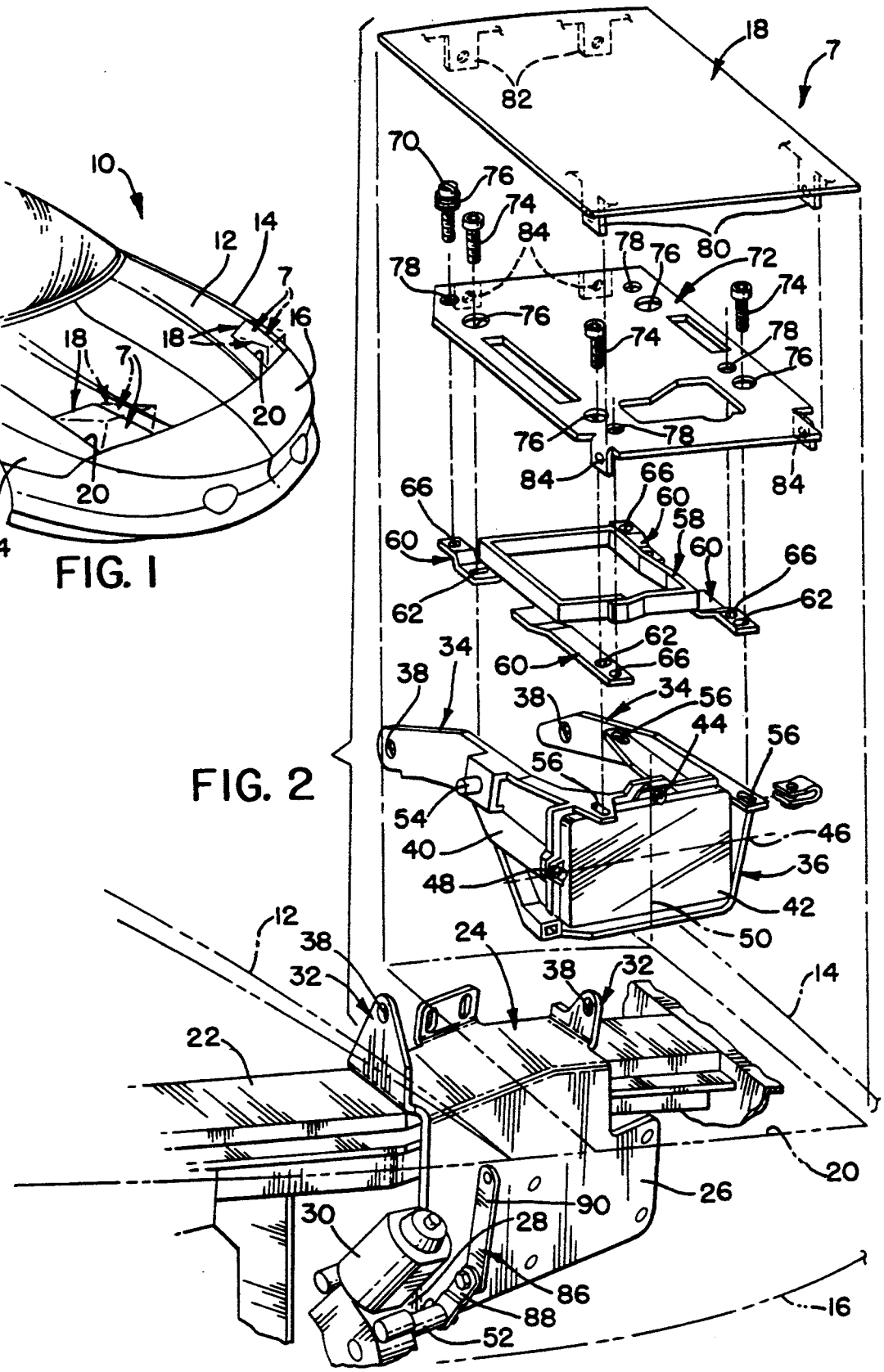
FIG. 1 is a perspective view of the front of a vehicle with a retractable concealed headlamp assembly according to a preferred embodiment of the present invention. The headlamp assembly is shown in phantom in the open position.
FIG. 2 is an exploded view showing a headlamp housing, a spider bracket, an intermediate panel and the cover panel.

Referring to FIGS. 1 and 2, an automotive vehicle 10 utilizing the present inventive headlamp assembly 7 has a front end with a hood 12, fender 14 and front fascia 16. A headlamp cover panel 18 in a closed position must be flush with an opening 20, hood 12, fascia 16 and fender 14. The abovementioned task is made even more difficult since the hood 12 and fender 14 are both sloping members. Additionally, to maximize an attractive appearance, the gap and flushness lines between the cover panel 18 and the hood 12, fascia 16 and fender 14 should be maintained as constant as possible.

A cross car panel 22 provides location and support for both the fascia 16 and the headlamp assembly 7. Mounted rearward of the fascia 16 to a cross car panel 22 of the vehicle 10 is a pivot bracket 24. The pivot bracket is fixably mounted with the cross car panel 22 and has a vertical end 26. The vertical end has an ear 28. The ear 28 has connected thereto an electrically powered motor actuator 30. The pivot bracket also has two pivot flanges 32 spaced from one another.

Pivotally mounted to the flanges 32 by extending arms 34 is a headlamp housing 36. (Note that the pivot pins have been removed for clarity of illustration. The pivot pins would extend through apertures 38.) A main frame body 40 of the headlamp housing provides the connections and the support for a headlamp fixture 42. A conventional adjuster nut 44 pivots the headlamp 42 along a pivotal axis 46 to adjust the headlamp 42 in a vertical plane. Another adjuster nut 48 adjusts the headlamp 42 along pivotal axis 50 to adjust the headlamp 42 in a horizontal plane. The adjustment of the aim of the headlamp 42 is totally independent of any adjustment for the cover panel 18.

To move the headlamp housing 36 from a retracted to an open position, there is a two-piece linkage 86 having one member 88 fixably connected perpendicularly with a shaft 52 of the motor actuator 30. A second linkage member 90 is pivotally connected to the opposite end of the first linkage member 88. The second linkage member 90 is additionally pivotally connected with a stud 54 of the headlamp housing.

The headlamp housing along its upper end has four longitudinally (three shown) fore and aft oblong fastening holes or slots 56 whose purpose is to provide a fore/aft slip plane to a spider bracket 58.

Fitted on top of the headlamp housing is the spider bracket 58. The spider 58 has four extending legs 60, and each leg has a slot 62 generally transversing the cross-car direction of the vehicle 10. The spider 58 also has four attached anchor nuts (not shown) or threaded openings at location 66 for receipt of ball head set screws 70 to be described later.

Above the spider 58 is an intermediate door panel 72. The intermediate door panel has four enlarged holes 76 to allow access to a set of screw fasteners 74 which connect the spider 58 with the headlamp housing 36. Additionally, the intermediate panel 72 has to facilitate up/down set screws 70 which have a ball head 76 captured within the intermediate panel apertures 78. By turning these bolts, the height of the intermediate panels 72 is set with respect to the spider 58, thereby allowing for adjustment of the cover panel 18 with respect to the fender 14, fascia 16 and hood 12. The set screws 70 between the intermediate panel 72 and the spider 58 allow for fore and aft height adjustment of the cover panel 18, which permits independent height adjustment of the cover panel's four corners.

Fitted on top of the intermediate panel 72 is the cover panel 18 which has two descending flanges 80 facing one another in the front and two flanges 82 facing the aft direction in the rear. The above arrangement allows the cover panel 18 to be connected with the intermediate panel 72 without any fasteners being able to be viewed in the top direction when the headlamp assembly 7 is retracted.

During assembly, a fixture simulating the cover panel 18 is attached to four holes 84 to visually simulate the cover panel 18 and permit access to all adjustments. J-nuts are then inserted on the headlamp housing surrounding the slotted flanges of the housing which surrounds the longitudinal slots 56. The fastening screws 74 are projected through the intermediate panel 72 and the spider 58. The intermediate panel 72 and spider combination is moved in the fore and aft direction and in a transverse direction to properly position the intermediate panel 72 with the opening 20 provided in the fender 14, hood 12 and fascia 16. The fasteners 74 are then fully torqued. The height adjustment set screws 70 are then torqued to insure the proper height of the intermediate panel 72. After that operation, the cover panel 18 can then be attached to the intermediate panel 72 and installation is complete.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A concealed headlamp assembly for a vehicle having a vehicle body with a front panel having a headlamp opening, the headlamp assembly comprising:
   a headlamp housing pivotally mounted with respect to the vehicle for movement between a closed position and an open position;
   a headlamp mounted to the headlight housing for movement with the headlamp housing between the closed and open positions, and the headlamp being adjustable relative to the headlamp housing for positioning the headlamp in an aim position when the headlamp housing is in the open position;
   motor means for moving the headlamp housing between the open and closed positions;
   a cover panel for covering the headlamp opening flush with the vehicle body opening when the headlight housing is in a closed position, the cover panel having fore and aft ends;
   means to adjust the cover panel fore and aft with respect to the headlamp housing;
   means to adjust the cover panel cross car with respect to the headlamp housing; and
   means to adjust at least one of the fore and aft ends of the cover panel vertically with respect to the headlamp housing.

2. A concealed headlamp assembly as described in claim 1 wherein both the fore and aft ends of the cover panel are adjustable vertically with respect to the headlamp housing.

3. A concealed headlamp assembly as described in claim 1 having a spider intermediate the cover panel and the headlamp assembly, the spider being adjustably connected fore and aft and cross car with respect to the headlamp housing.

4. A concealed headlamp assembly as described in claim 3 further including an intermediate panel juxtaposed between the cover panel and the spider, the intermediate panel having set screws operatively associated with the spider to provide fore and aft vertical adjustment of the cover panel with respect to the headlamp housing.

5. A concealed headlamp assembly as described in claim 1 further including a pivot bracket fixably attached to the vehicle, the headlamp assembly being pivotally mounted to the pivot bracket.

6. A concealed headlamp assembly for a vehicle having a vehicle body including a front panel with a headlamp opening, the headlamp assembly comprising:
   a pivot bracket mounted to the vehicle body;
   a headlamp housing pivotally mounted to the pivot bracket for movement between a closed position and an open position;
   a headlamp mounted to the headlamp housing for movement with the headlamp housing between the closed and open positions, the headlamp being adjustable relative to the headlamp housing to position the headlamp in an aim position when the headlamp housing is in the open position;
   a motor connected with the vehicle body linkably connected with the headlamp housing to move the headlamp housing in the open and closed positions;
   a spider adjustable in fore and aft and cross car directions with respect to the headlamp housing;
   an intermediate panel having fore and aft ends vertically adjustable with respect to the spider; and
   a cover panel having means of concealed attachment with the intermediate panel for fitting flush in the headlamp opening with respect to the vehicle body when the headlamp housing is in the closed position.

* * * * *